(12) United States Patent
Tzidon

(10) Patent No.: US 7,605,750 B2
(45) Date of Patent: Oct. 20, 2009

(54) ENHANCING MOBILE MULTIPLE-ACCESS COMMUNICATION NETWORKS

(75) Inventor: Aviv Tzidon, Tel Aviv (IL)

(73) Assignee: BVR Ststens (1998) Ltd., Rosh Ha'ayin (IL)

( * ) Notice: Subject to any disclaimer, the term of this patent is extended or adjusted under 35 U.S.C. 154(b) by 126 days.

(21) Appl. No.: 10/554,503

(22) PCT Filed: Apr. 28, 2004

(86) PCT No.: PCT/IL2004/000355

§ 371 (c)(1),
(2), (4) Date: Oct. 30, 2006

(87) PCT Pub. No.: WO2004/098111

PCT Pub. Date: Nov. 11, 2004

(65) Prior Publication Data

US 2007/0127406 A1    Jun. 7, 2007

Related U.S. Application Data

(60) Provisional application No. 60/465,770, filed on Apr. 28, 2003, provisional application No. 60/465,764, filed on Apr. 28, 2003, provisional application No. 60/465,768, filed on Apr. 28, 2003, provisional application No. 60/474,251, filed on May 28, 2003, provisional application No. 60/474,252, filed on May 30, 2003.

(51) Int. Cl.
*G01S 1/02* (2006.01)
*G01C 21/00* (2006.01)

(52) U.S. Cl. ............... 342/357.06; 342/357.12; 701/213

(58) Field of Classification Search .......... 342/165, 342/357.02, 357.06, 357.12; 701/207, 213, 701/215; 370/316, 332
See application file for complete search history.

(56) References Cited

U.S. PATENT DOCUMENTS

| 5,396,644 | A | | 3/1995 | Tzidon et al. |
| 6,075,987 | A | * | 6/2000 | Camp et al. ............. 455/427 |

(Continued)

FOREIGN PATENT DOCUMENTS

WO    WO 97/11385    3/1997

OTHER PUBLICATIONS

Bloch et al. "Highly reproducible state-of-the-art quartz oscillators" May 29, 2002. pp. 615-618. XP010619012.

(Continued)

*Primary Examiner*—Dao L Phan
(74) *Attorney, Agent, or Firm*—Pearl Cohen Zedek Latzer, LLP

(57) ABSTRACT

A global positioning system receiver for use to determine accurate position during flight based on data received from GPS satellites, the receiver including a clock with high short term accuracy, to allow determination of position even when data is received from less than four satellites, wherein the receiver is able to: extrapolate a trajectory forward for a period of a few seconds, and calculate a predicted reachable set (PRS) related to the extrapolated trajectory; and while receiving data from four satellites or more, to calibrate the clock in synchrony with the GPS clock.

9 Claims, 9 Drawing Sheets

U.S. PATENT DOCUMENTS

| | | | |
|---|---|---|---|
| 6,373,432 B1* | 4/2002 | Rabinowitz et al. | 342/357.16 |
| 6,516,021 B1* | 2/2003 | Abbott et al. | 375/150 |
| 6,731,947 B2 | 5/2004 | Hoagland et al. | |
| 6,774,839 B2* | 8/2004 | Talbot et al. | 342/357.06 |
| 2002/0030625 A1 | 3/2002 | Cavallaro et al. | |
| 2005/0004748 A1* | 1/2005 | Pinto et al. | 701/200 |
| 2006/0095206 A1* | 5/2006 | Garin et al. | 701/213 |

OTHER PUBLICATIONS

Dr. Alison Brown "A low cost vehicle location and tracking system" Jan. 1992. pp. 516-523. XP000344345.

PCT Search Report for International Application PCT/IL2004/000355 mailed Oct. 25, 2004.

Supplementary European Search Report for Application No. EP 04729971.4 mailed Mar. 14, 2007.

* cited by examiner

ENHANCING MOBILE MULTIPLE-ACCESS COMMUNICATION NETWORKS

CROSS-REFERENCE TO RELATED APPLICATIONS

This application is a National Phase Application of PCT International Application No. PCT/IL2004/000355, International Filing Date Apr. 28, 2004, which claims priority of U.S. Provisional Patent Application 60/465,770, filed Apr. 28, 2003; U.S. Provisional Patent Application 60/465,764, filed Apr. 28, 2003; U.S. Provisional Patent Application 60/465,768, filed Apr. 28, 2003; U.S. Provisional Patent Application 60/474,251, filed May 28, 2003; and U.S. Provisional Patent Application 60/474,252, filed May 30, 2003, the entire disclosures of all of which are incorporated herein by reference.

FIELD OF THE INVENTION

The present invention relates to mobile multiple access communication. More particularly it relates to novel features in mobile multiple access communication systems.

BACKGROUND OF THE INVENTION

Communication between a transmitter and a receiver is only effective within a predetermined radius R. When data communication is required between moving participants each of whom is provided with a suitable transmitter and receiver, each participant would receive data transmitted by any other participant within a radius R thereof unless, of course, steps were taken to prevent this. Whilst it is possible to allocate different transmission frequencies to each of the participants, this is not feasible when completely reciprocal data communication is required between all of the participants. Such reciprocal data communication is a requirement, for example, in military aircraft where a limited number of pilots must be able to maintain contact with other friendly pilots all of whom must, therefore, transmit and receive data at the same network.

In such data communication, it is clearly an imperative that a pilot receive data from only one transmitter at any given time in order to avoid the collision which would result from more than one transmission being received simultaneously. At its simplest, this desideratum can always be achieved by allocating time slices to each of the participants so that only one can transmit during any given time slice. According to such an approach, each participant transmits data during his time slice only and all participants within a radius R of the transmitting participant will receive the transmitted data.

U.S. Pat. No. 5,396,644 (Tzidon et al.) discloses a method and system of communicating between moving participants such that each participant is provided with a first time slice and a respective priority listing containing the name of each participant once only, each participant thus having the top priority for one first time slice only. Also allocated to each participant is a second time slice during which he must transmit his identity as well as the identities of all his near neighbors within a radius R thereof. For each participant A there is stored the identity of all near neighbors B(A) and all far neighbors C(A) being within a radius R of his near neighbors B(A) and who are not also near neighbors B(A) of A. During each first time slice, any participant having a higher priority for the respective first time slice than all of his near and far neighbors may transmit data including the identities of at least those of his near neighbors who became near neighbors since his previous transmission. During each second time slice, non-transmitting participants update their respective list of near neighbors in respect of a transmitting participant according to whether his transmission is, or is not, received by them.

The present invention takes the above-mentioned concept further and provides several enhancements and novel features as is described herein.

SUMMARY OF THE INVENTION

It is an object of the present invention to provide a global positioning system receiver for use to determine accurate position during flight based on data received from GPS satellites, the receiver including a clock with high short term accuracy, to allow determination of position even when data is received from less than four satellites.

In a preferred embodiment of the invention, the receiver is able to extrapolate a trajectory forward for a period of a few seconds, and calculate a predicted reachable set (PRS) related to the extrapolated trajectory; and while receiving data from four satellites or more, to calibrate the clock in synchrony with the GPS clock.

According to another preferred embodiment, the receiver is able to calculate, when receiving data from less then four satellites, new ranges to available satellites using the clock, and based on the new ranges to estimate position and velocity.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

Figure 1:
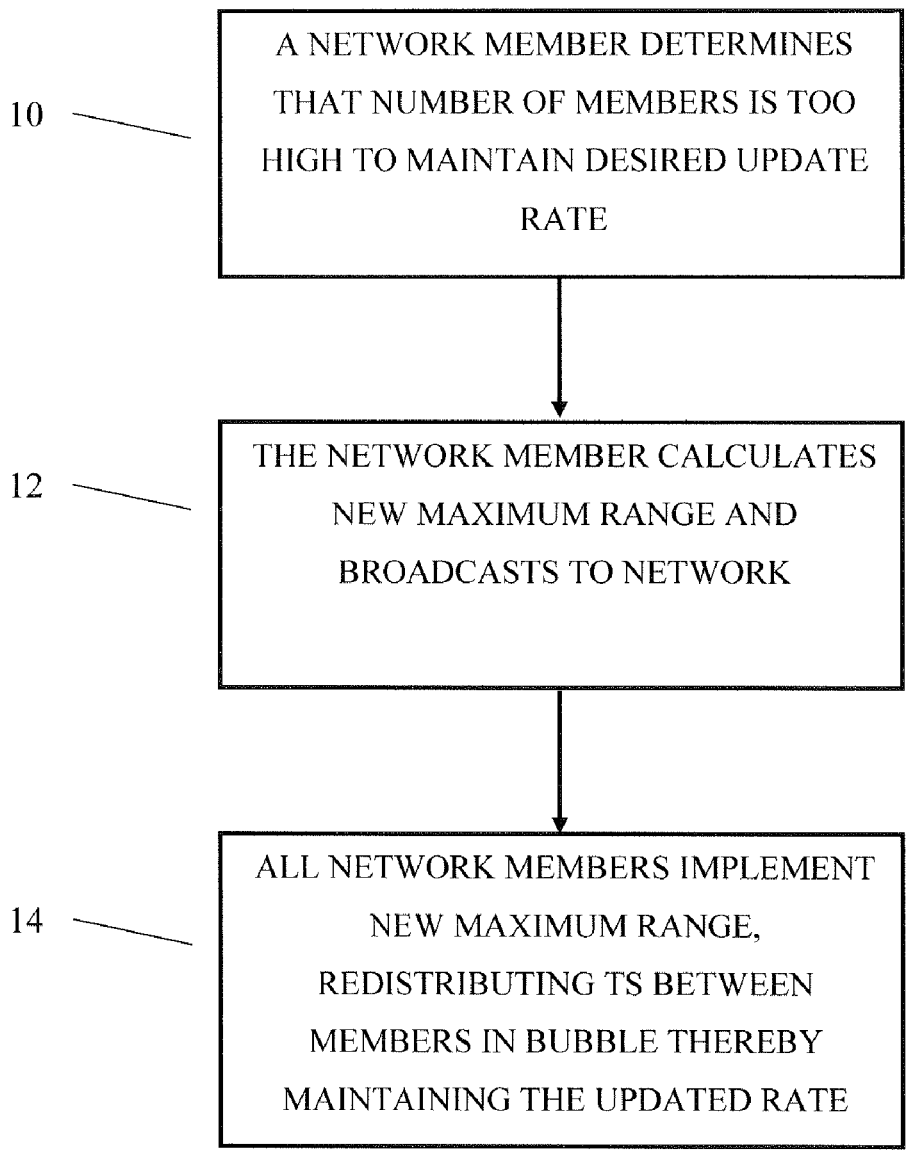
FIG. 1 is a block diagram of the procedure for maintaining the dynamic network's update rate.

Existing radio frequency (RF) networks have a finite maximum (max) range, which is the outcome of several parameters, such as output power, antenna gain, and receiver gain. Some situation awareness networks have dynamically changing uses. Sometimes, the greatest possible flow of information is needed. On the other hand, in tight combat scenarios, the primary need is for a fast update rate.

Mobile multiple access communications networks usually include a fixed number of participants. Therefore the issue of dynamically modifying the network parameters in such networks is not required.

However, the present invention relates to a dynamic network, such as that described in U.S. Pat. No. 6,396,644, (Tzidon, et al), 1993, METHOD AND SYSTEM OF COMMUNICATION BETWEEN MOVING PARTICIPANTS. The object of the present invention is to adapt a multiple access network to guarantee a selected update rate for its members. As more participants join the network, there are less system time slots resources to share. Utilizing the ability to reduce the max range of the group (bubble), as disclosed herein will guarantee a predetermined update rate at all times by reducing the group/bubble size in real time.

The protocol of the proposed network is founded on the following common structure:

All network members are synchronized with accurate global time.

All network members share the knowledge of the order of TS allocations.

All network members share the knowledge of the order of frequency series.

The order of frequency in the series changes according to a time dependent algorithm, in time steps faster than the time it takes to transmit the data. This is necessary since, while the present invention reduces the network bubble, it is still possible that someone outside the bubble yet within range will transmit on that time slot and cause an RF collision with a message from a member within the bubble. Since the message from the participant within the bubble arrives earlier than the message from outside the bubble, to avoid the potential collision the receiver should change frequency immediately at the beginning of the message and proceed with the frequency hopping.

All network members wait in receive mode with the first frequency of the series of the current TS.

Network capabilities are enhanced by the guaranteed minimum update rate provided by the present invention.

In dynamic networks, changing of the bubble size introduces a variation in the update rate.

For example, if the number of participants increases within the same bubble size, the network update rate will drop correspondingly. At some phases of network operation, it is desirable to ensure that the update rate not drop below certain levels.

When a participant wishes to maintain a higher update rate, the participant announces (by broadcasting this to the other participants) that his max range will be smaller, forcing smaller network bubble.

Once the max range is smaller, fewer members will be inside the smaller bubble.

The number of participants in the local bubble (NPLB) is the main factor that controls the network's update rate.

Each participant, once bubble size has been reduced, correspondingly reduces the number of members (by updating his personal bubble members list) to include only those within the smaller bubble.

Each of the network members has the knowledge of the range of the transmitted message, since it equals the time elapsed from the start of the TS to the time the message starts to be received.

With reference to FIG. 1, the procedure for maintaining the dynamic network's update rate is as follows:

Step 10: A network member determines that NPIB too high to maintain desired update rate.

Step 12: The network member calculates new maximum range and broadcasts to network.

Step 14: All network members implement new maximum range, reallocating TS between members in the reduced bubble, thereby maintaining the update rate, The present invention utilizes the fact that the order of frequency series is well coordinated among network members to enable better network utilization of time, since the majority of the members are within a range that is closer than the network's RF max range. The current invention provides a network architecture where the max range the RF link can be adjusted, thereby enabling filtering of RF from unwanted participants within physical RF range.

As the number of participants in the network bubble increases, the update rate of the network drops linearly. In a preferred embodiment of the present invention, in a case where the update rate is more important than max range, each participant has the freedom to choose to increase the update rate by reducing the number of participants in his bubble.

In order to reduce the number of participants, the participant calculates the bubble radius that will enclose the desired number of participants. Once this radius is known, the participant announces it to the other bubble members. All the bubble members then create a new bubble to accommodate the desired update rate.

Mobile multiple access communications networks that use time division multiplex access (i.e. TDMA), have to define the length of the time slots (TS) according to the max range of reception of the members' transmitters. Usually the size of TS is the sum of the time that the signal has to travel to the max range (also referred to as propagation delay (PD)) plus the time it takes to transmit the desired number of bits of the communication block.

Therefore, the actual max range of the transmission can vary. For example, cases are known where the actual max range is three times greater than the designed max range.

To accommodate this extra max range, guard time (GT) is added to the PD. In the example, the GT would be three times the PD.

However, the radio frequency (RF) link budget that defines the max range also depends on other propagation phenomena, like multipath (signal arrives by two or more paths), humidity, topography of the landscape, etc.

Figure 2:
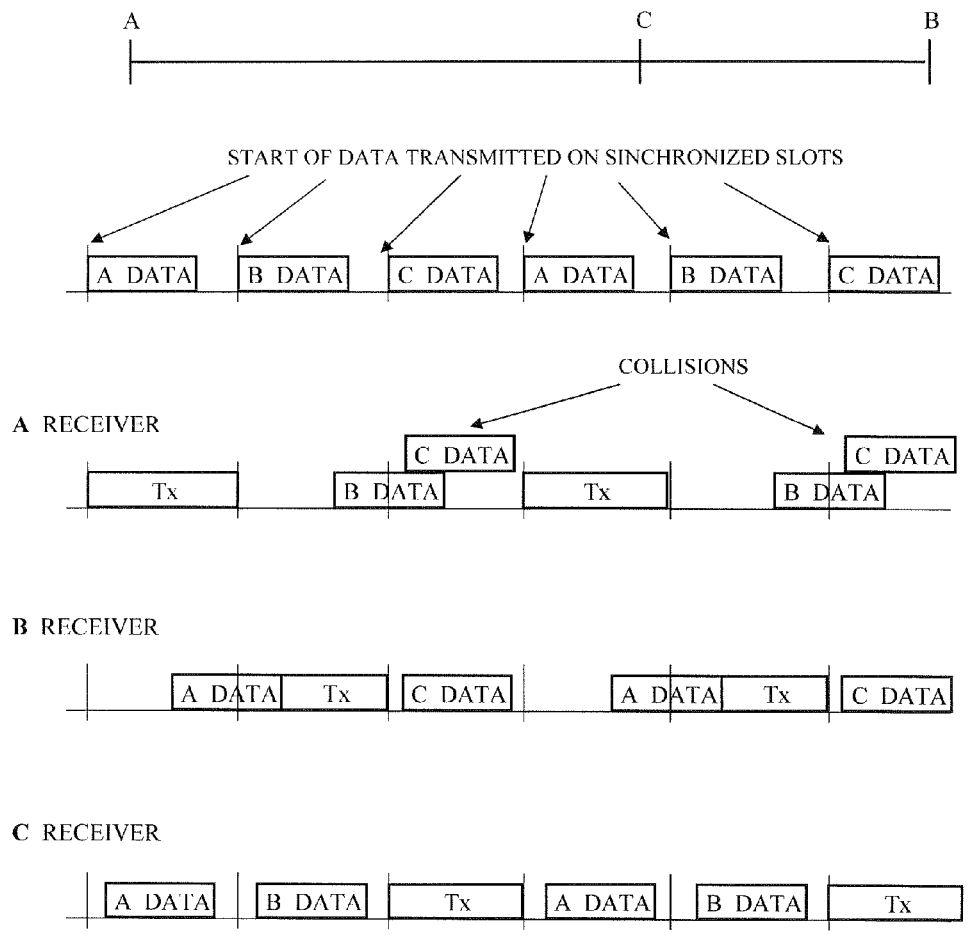
FIG. 2 is a schematic time-diagram illustration of time slot utilizing during transmissions between two or more stations.

FIG. 2 illustrates a case where a listener A receives data from a distant transmitter B with so great a delay that message from B extends into the TS reserved for C, jamming both messages.

The present invention enables a network member to dynamically use some or all of the GT for other purposes and also allows each member of the network to determine its optimal max range for reception. This determination can be made without needing to take into account physical RF max range constraints.

This makes it possible for the TS to be comprised primarily of the transmitted information.

While a long max range may be desirable in a mobile multiple access communications network, it can dramatically reduce the network's efficiency. The selected max range affects the PD and the GT calculations.

Example: a network with data transmission size of 1 millisecond and max range of 100 miles must maintain that messages are delivered at a bit error rate (BER) better than one per million.

In order to meet this requirement, the "fade in" margins are calculated for a worse case scenario wherein the actual max range can be as high as 300 miles (200 miles more than the planned max range). To prevent possible RF collisions between a message from outside the planned max range in TS (A) and a message from within the planned max range in TS (A+1), the GT has to be set for 2 milliseconds. Therefore, for a data transmission of 1 millisecond, a TS of 4 milliseconds is required: (1 millisecond PD+2 milliseconds GT+1 millisecond data=4 milliseconds TS). In this example, when transmitting, a member transmits for 25% of a TS and waits the remaining 75%.

The current invention increases the probability of message delivery without jamming member messages from far distances (i.e., messages from the previous TS that run into the current time slot).

To minimize the loss of data, members can rearrange their data before transmission according to either or both of the following algorithms:

The most important data is put first, followed by the rest of the data in descending order of importance (thereby ensuring that any data cut off is of least importance).

Data is arranged by relevance for the other members in the network according to their locations. Therefore data of relevance for members who are relatively nearer (determined from the propagation delay in messages received from them) to the transmitting member, is put relatively later in the data stream, since it is assured of reaching its targets before the end of the time slice.

These procedures for rearranging the data ensure that receiving members who are at the max range receive the most important data and the data most relevant for them before the end of the TS.

The TS allocation order is known to all members. Therefore, when a message is transmitted, all receiving members know who is transmitting. Based on the propagation delay, a receiving member can determine whether some of the message will extend into the next time slot. If that is the case, the receiving member can decide on one of two courses of action based on the relative importance he assigns to the transmitting member and other factors.

The receiving member can choose to either listen only to the first part of the message (until the next time slot starts) or to listen to the entire message (taking into account that this will result in the loss of the next incoming message since it will overlap the next message's time slot)

The proposed invention utilizes the fact that the order of frequency series is well coordinated among network members. It enables better network utilization of time since the majority of the members are within a range that is closer than the network's max range.

Figure 3:
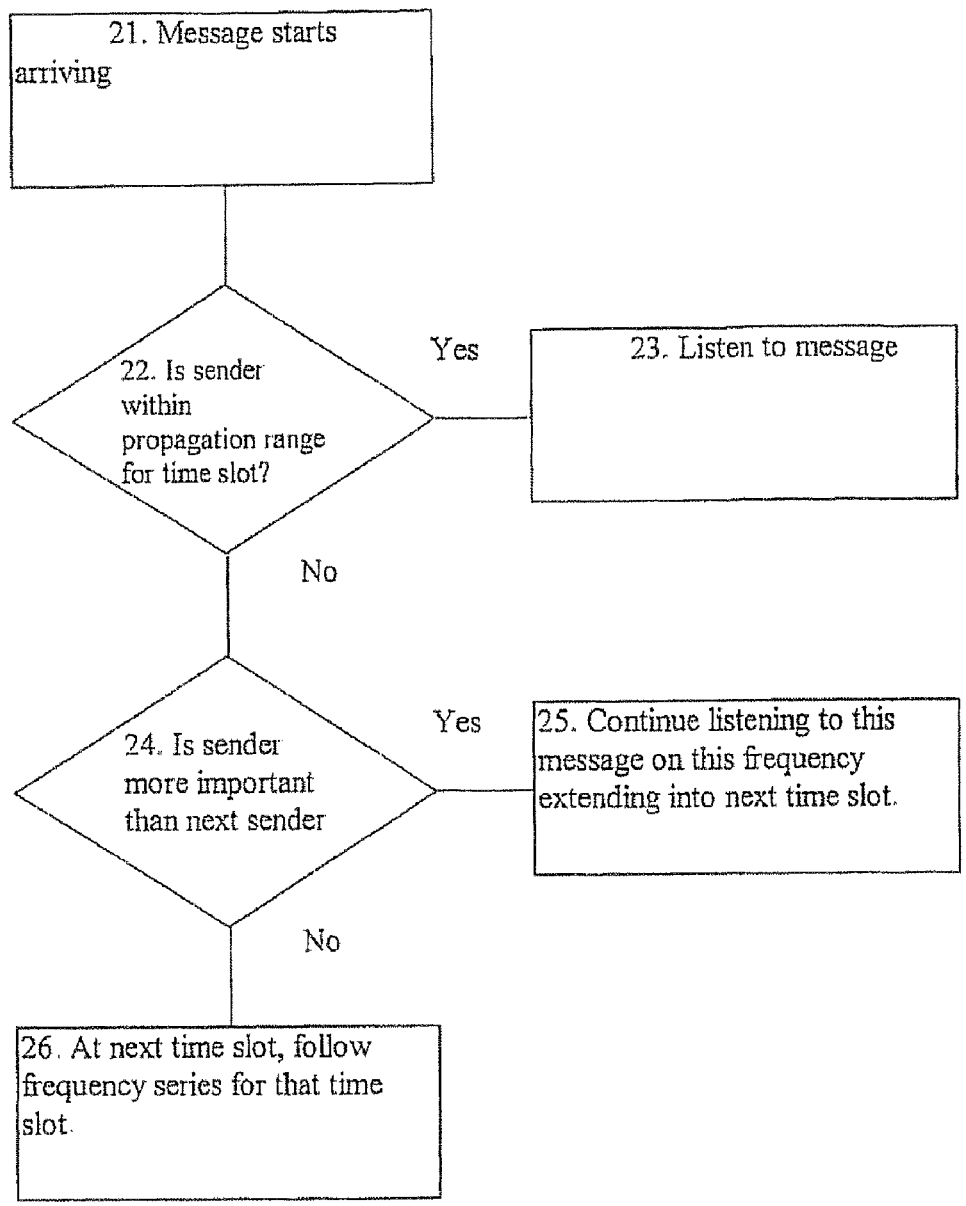
FIG. 3 is a block diagram of a procedure for applying dynamic filtering to messages from outside the max range of a dynamic network

Therefore, with reference to FIG. 3, the procedure for applying dynamic filtering to messages from outside the max range of a dynamic network comprises:

Step 21: Message starts arriving

Step 22: Receiver checks whether sender within propagation range for time slot?

Step 23: If yes, Listen to message

Step 24: Otherwise, check whether the sender is more important than the next sender, who will transmit on the upcoming TS (Optionally, periodically check if the time elapsed from the last complete message received is bigger than a specific threshold).

Step 25. If yes, continue listening to this message on this frequency extending into next time slot.

Step 26: Otherwise, upon next time slot, follow frequency series for that time slot.

Figure 4:
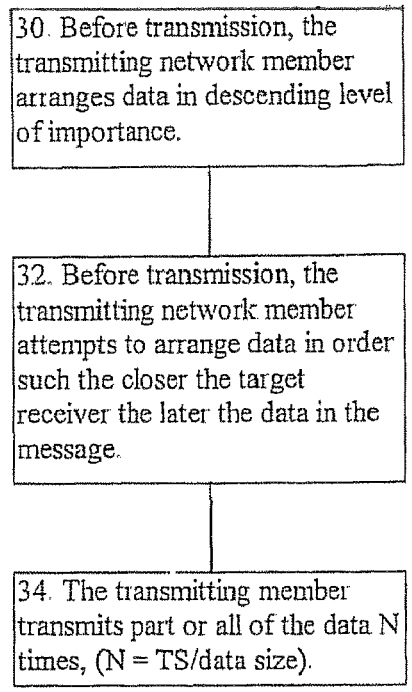
FIG. 4 is a block diagram of options for maximizing the success of the transmission of a transmitting member.

With reference to FIG. 4, the transmitting member has several options for maximizing the success of his transmission:

30. Step 30: Before transmission, the transmitting network member arranges data in descending level of importance.

Step 32: Before transmission, the transmitting network member attempts to arrange data in order such the closer the target receiver the later the data in the message.

Step 34: The transmitting member transmits part or all of the data N times, (N=TS/data size), Each network member knows the range of the transmitted message (range equals the elapsed time from the beginning of the TS to the time of receiving).

EXAMPLE

Receiving members of the network measure the time it takes for a message to arrive. This measurement is done by all receiving members for every message, keeping them current regarding the range of the transmitting member.

The receiving members of the network filter out transmissions that arrive too late (the members are outside the desired range of the network).

Another object of the present invention is to allow a member of a multiple access network to dynamically increase the network's max range and therefore be able to send the information as far as necessary, by reducing the transmission bit rate The current invention enables real-time control of the network's max range in inverse relation to the bit rate: lowering the bit rate gains range, raising the bit rate seduces range.

The network's capabilities can be enhanced by dynamically controlling the network's max range.

The number of members in the local bubble (NMLB), is the main factor that determines the network's update rate, which is the number of times per second that each member sends his data.

NMLB×TS=Cycle Time.

Update Rate=1 sec/Cycle Time

Figure 5:
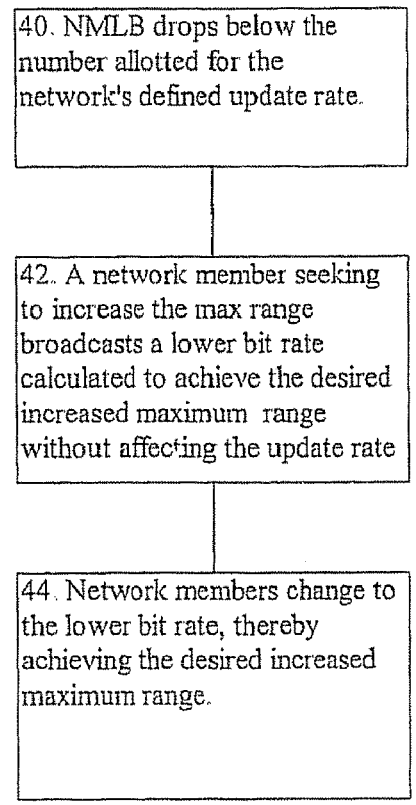
FIG. 5 is a block diagram of a procedure for dynamically increasing the network's max range.

Therefore, with reference to FIG. 5, the procedure for dynamically increasing the network's max range comprises:

Step 41: If the NMLB drops below the number allotted for the network's defined update rate, part of the TS becomes unutilized.

Step 42: A network member seeking to increase the max range announces a new, lower bit rate calculated to achieve the desired increased max range without affecting the update rate.

Step 44: The network adopts the new, lower bit rate, thereby increasing the max range.

Figure 6:
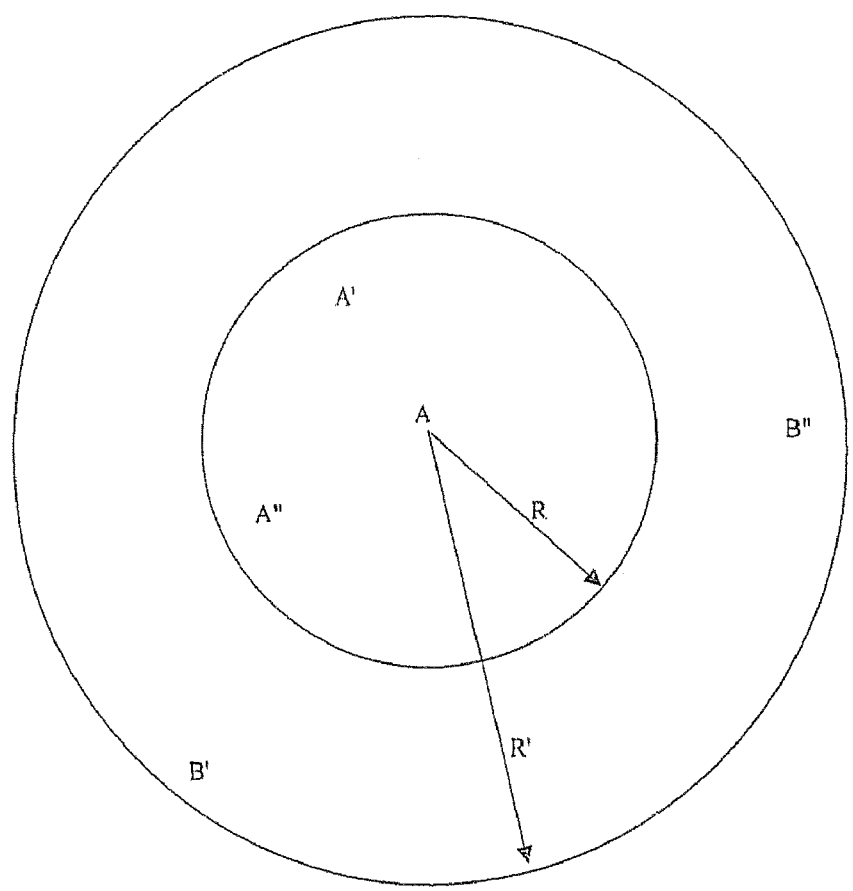
FIG. 6 illustrates the chance in the number of transmitting members due to the chance in range.

As shown in FIG. 6, the increase in max range from R to R' brings more members inside the bubble.

Another feature of the present invention relates to global positioning systems. These systems can be used to determine the position of members of mobile multiple access communication networks.

GPS technology is based on precise time and position information. Using atomic clocks and location data, each GPS satellite continuously broadcasts an accurate timing signal and its position. A GPS receiver determines its position by measuring its distance from several GPS satellites at the same instant in time.

The GPS receiver measures its distance to a GPS satellite by measuring the time required for the GPS satellite signals to travel from the satellite to the receiver and uses the time to calculate the distance.

Then the GPS receiver looks up the current position of the GPS satellite in an electronic almanac (record of positions over time).

Using the distance measurements for at least three satellites in an algorithm computation, the GPS receiver arrives at an accurate position fix. Information must be received from three satellites simultaneously in order to obtain a two-dimensional fix (latitude, longitude, and time), and from four satellites for a three-dimensional fix (latitude, longitude, altitude, and time).

The reference time by which the GPS receiver measures the delta time required for the GPS satellite signals to reach it is kept by an oscillator in the GPS receiver. Such oscillators typically have a time accuracy of 1 pulse per million (PPM), which translates to 300 meter per second (error of 300 meters per second from previous measurement). (The speed of light is 300,000,000 meter a second, therefore if the oscillator loses 1 pulse per million it equals an error of 300 meters!!)

The customary way to overcome such timing errors in the GPS receiver is to tale four measurements, each from a different satellite.

Satellite ranging, also known as pseudoranging," is the most common method for compensating for GPS timing errors is based on timing existing always a slight variance in accuracies between the receiver's clock and the satellite's clock; therefore, the estimated range contains error.

Pseudoranges don't give the true distance but rather an estimate. However, by measuring the pseudoranges from at least four GPS satellites, the GPS receiver generates an estimate of its position and determines the time error.

Sources of errors in order of significance are:
selective availability (SA)
geometric dilution of precision (GDOP)
satellite clocks
GPS satellite orbits
earth's atmosphere
multi-path
GPS Receivers
Selective Availability (SA)

The U.S. Department of Defense sometimes intentionally adds random error to the system in order to limit its use by hostile forces during times of military crisis.

Geometric Dilution of Precision

Satellite geometry has a large affect on precision. GDOP is the measure of the accuracy of the current GPS satellite position for measuring the GPS receiver's position. The best GDOP is achieved when three GPS satellites are at 120 degrees from the GPS receiver's location and a fourth is directly overhead. Stated another way, GDOP refers to the quality of GPS satellite geometry and the magnitude of the error in position.

Satellite Clocks

The atomic clocks in these satellites are some of the most accurate and expensive clocks known, but they are not perfect.

Since signal travel at the speed of light, and since ranging estimates are based on measured signal travel time, a clock error of one millisecond produces a position estimation error of 186 miles (300 km)

GPS Satellite Orbits

The satellite orbits are so high that the earth's atmosphere doesn't affect them.

However, natural phenomena like gravitational forces from the moon and sun, as well as the pressure of solar radiation, create minor errors in satellite altitude, position and speed. These are called "ephemeris" data errors Earth's Atmosphere The atmosphere slows the radio signals, particularly in the ionosphere, a blanket of electrically charged particles 50 to 250 miles above the earth. After passing through the ionosphere, satellite signals must pass through the lower atmosphere, the troposphere, where water vapor may also increase delays.

Multipath Errors

These errors happen when GPS signals bounce around before reaching the GPS receiver, therefore, the signals arrive at the receiver's antenna by way of more than one path causing differences in travel distance and travel time.

GPS Receivers

Receiver clock errors sometimes are affected by noise due to electrical interference or rounding off a mathematical operation.

One of the main factors that drives the GPS receiver accuracy lower is the GDOP.

The components of the GDOP:
Horizontal Dilution of Precision (HDOP)–
  Horizontal=Latitude and Longitude
Vertical Dilution of Precision (VDOP)–Vertical=Elevation
Position Dilution of precision (PDOP)–Position=Three
  dimensions
Time Dilution of Precision (TDOP)

The three key elements for high quality geodetic GPS measurements are using a stable atomic clock, obtaining accurate satellite orbits, and removing propagation effects.

High-end accurate GPS receivers use an atomic clock with long-term accurate time. Such atomic clocks are very expensive.

It would clearly be desirable to be able to use a low cost clock without having to significantly sacrifice time accuracy.

Another object of the present invention is to increase the accuracy of GPS by enabling virtual enhancement for best available GDOP. This is done by a very economical modification of the GPS receiver internal clock. Once the time error has been resolved, the gain in accuracy can be up to five times better and navigation, even in dynamic environments with high antenna obscuration, can continue.

In a preferred embodiment of the present invention, a GPS receiver is provided wherein the clock is inexpensive and highly accurate in the short term. An example of such a clock, may be an oven-stabilized oscillator with high short term accuracy, for example better than $10^{-11}$. This high short term accuracy clock, once the time bias error is determined, is capable of staying accurate and maintaining a level of drift equal to 3 cm per second. maneuvering the aircraft. By having such accurate time reference, the logic of triangulation of four GPS satellites at the same time is no longer needed. Instead the GPS receiver integrates over time multi-satellite pseudoranging that are actually real ranges from the GPS satellite (since the time error no longer exists).

In dynamic environments, antennas obscurations are always a limiting factor leading to high GDOP. The clock of the present invention provides over time the best available GDOP and navigation can continue even with less than 4 satellites at the same time. The price of oven stabilize oscillator is less than 1000 US $.

Description by Examples

At any given time, there are many satellites in the sky. As explained the GPS needs to "see" only 4 satellites at any given time. Yet, the satellites positions have significant influence on the GDOP and therefore on the GPS position accuracy. To illustrate the GDOP variance we have calculated the GDOP for different sets of 4 satellites.

The following example shows the sensitivity of GDOP to a subset of four satellites out of the available ones. In order to demonstrate that we took different subsets of 4 in a specific place and time:

On Apr. 18, 2003 21:30:00 UTC (GPS week=190 GPS TOW=509400 seconds): the position of the GPS receiver:
Altitude=673.0 Meters
Latitude=32° 39'18.70"N
Longitude=35° 39'9.91"E The first example takes the best subset of 4 satellites: (3, 7, 8 and 29) to give a result of GDOP=2.2

The second example takes another subset of 4 satellites: (8, 13, 28 and 29) to give a result of GDOP=3.5

The third example takes another subset of 4 satellites: (8, 10, 13 and 28) to give a result of GDOP=5.5

The fourth example takes another subset of 4 satellites: (8, 10, 27 and 28) to give a result of GDOP=10.0

The GDOP of the fourth example is 10 and the GDOP of the first is 2.2, which is more than 4 times less accurate.

Figure 7:
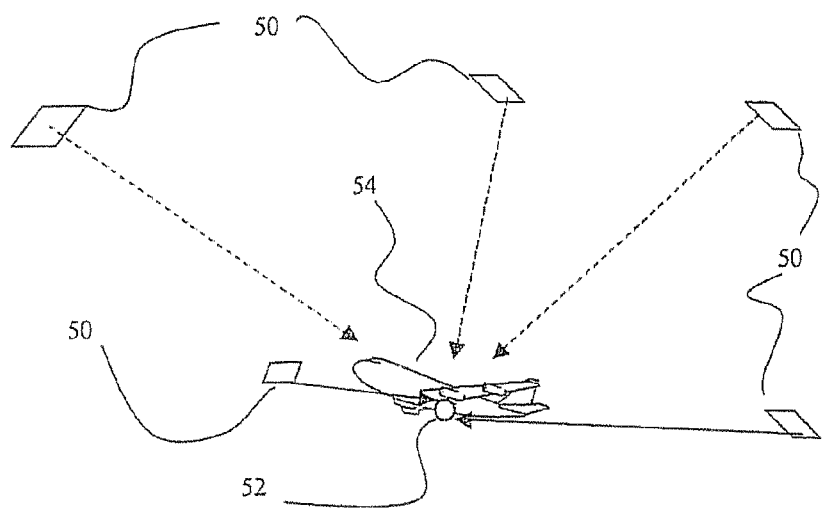
FIG. 7 illustrates a high dynamic GPS receiver.

FIG. 7 illustrates a high dynamic GPS receiver is configured in pod 52 (mounted on aircraft 54) and suffering from GPS satellites 50 being masked: usually the GPS receiver antenna location is under the wing and the aircraft fuselage blocks more than 40% of the open sky.

Figure 8:
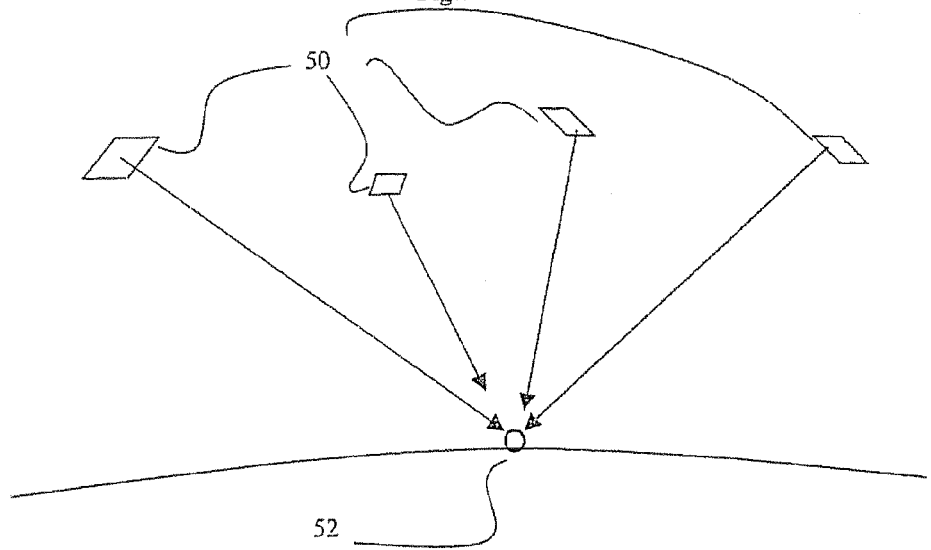
FIG. 8 illustrates a GPS receiver without interference between the receiver and the GPS satellites.

FIG. 8 illustrates a GPS receiver 52 without interference between the receiver and the GPS satellites 50.

Since a high dynamic aircraft normally turns more than 10 degrees per second, the GPS antenna, even though masked, sees all available satellites within 20 seconds. But part of the time sees less than 3 satellites simultaneously.

The present invention integrates each satellite using the short term accurate clock.

Depending on the dynamics of the aircraft, the preferred embodiment of the present invention can provide accurate GPS navigation up to 100% of the time.

Figure 9A:
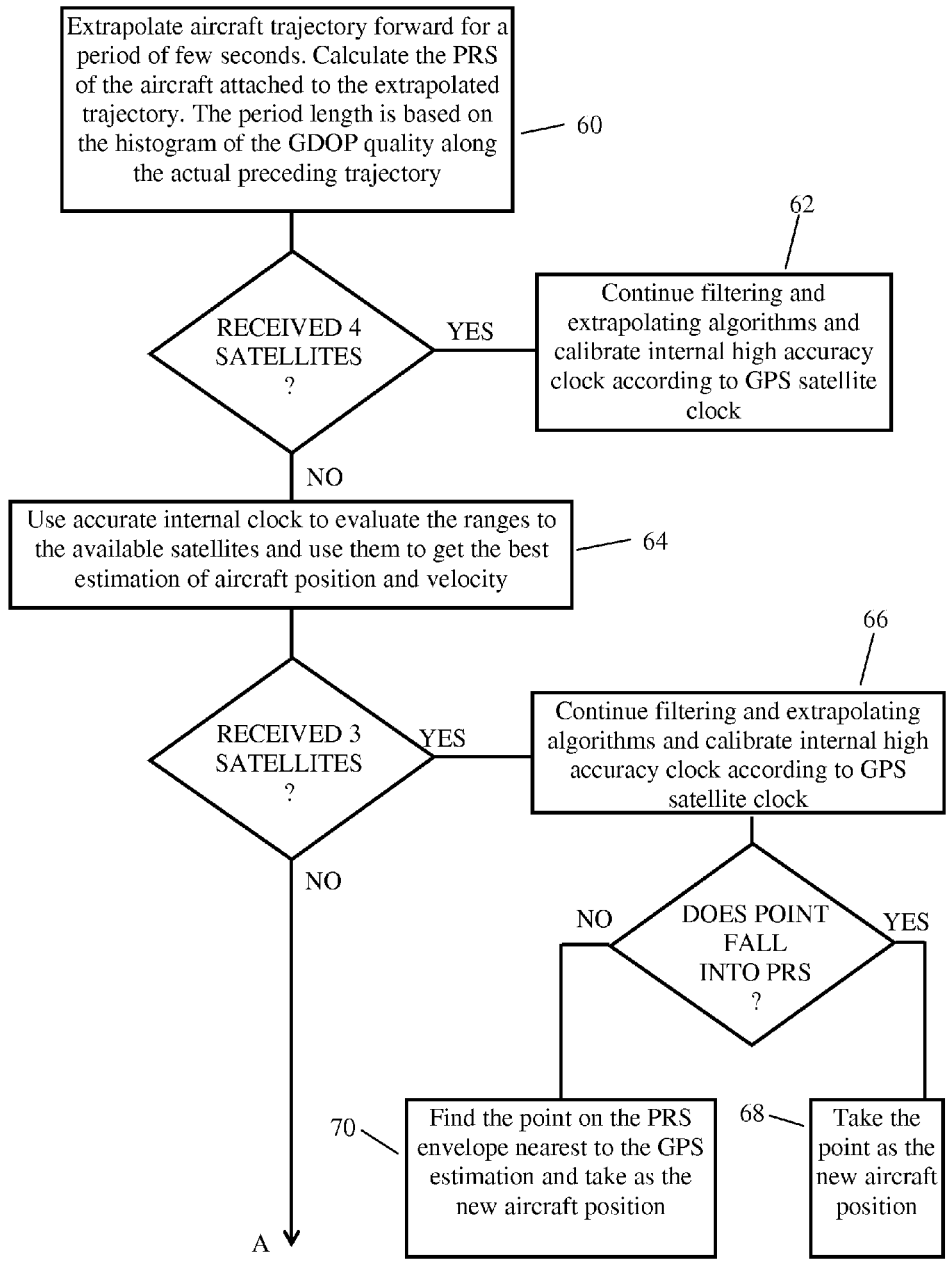
FIG. 9A and 9B are flowcharts illustrating the method by which the improved GPS navigation system of the present invention is operated.
Figure 9B:
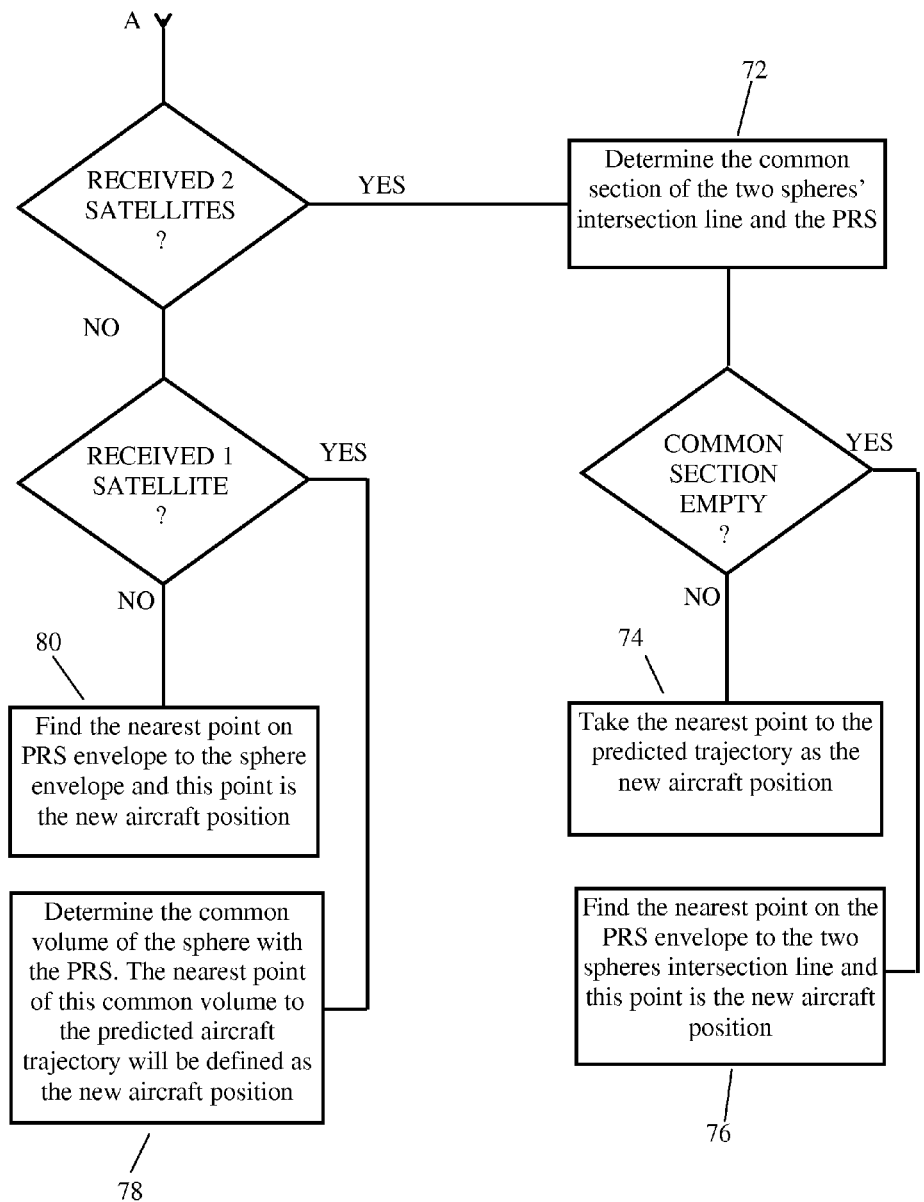
Figure 10:
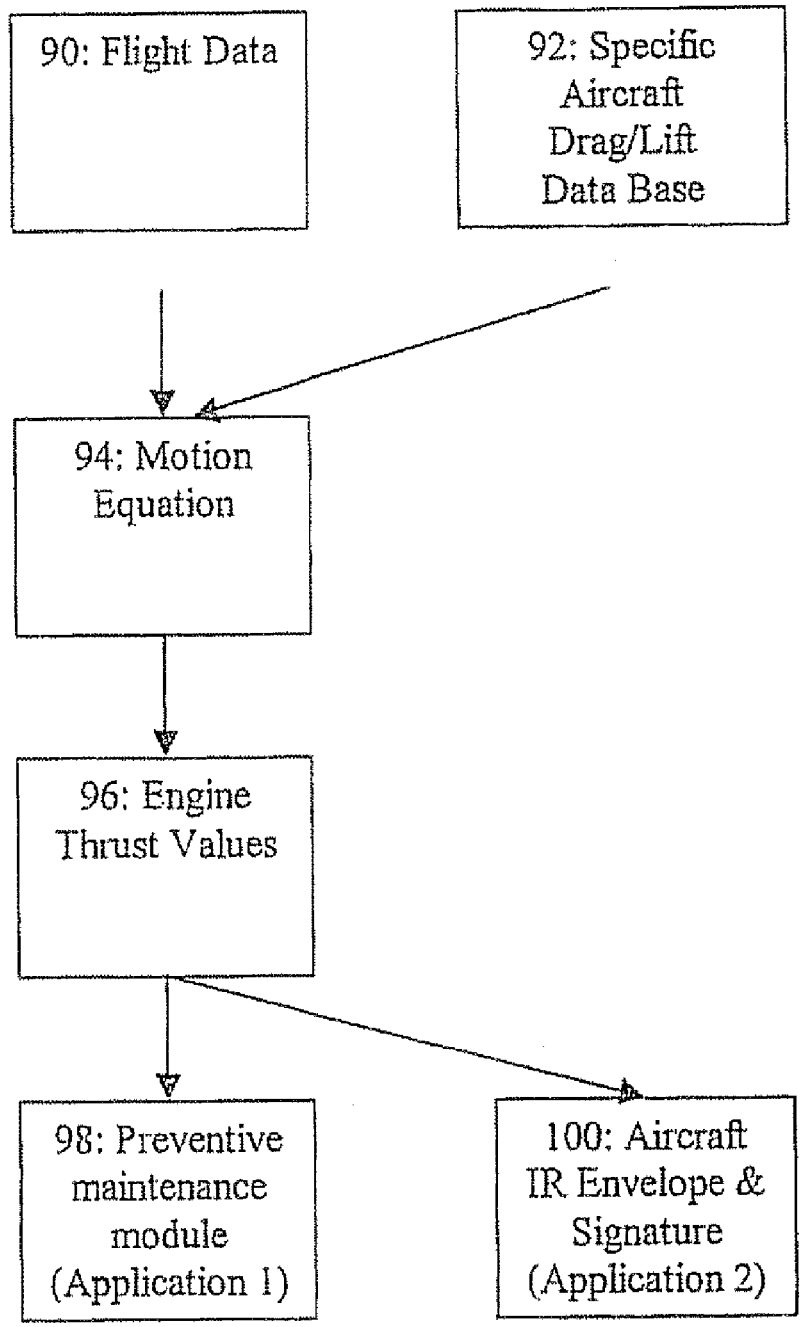
FIG. 10 is block diagram of a method for determining the thrust of an aircraft engine.

With reference to FIG. 9, the method by which the improved GPS navigation system of the present invention is operated is as follows:

Step 60: At any time during the flight, GPS receiver 52 extrapolates the aircraft trajectory forward for a period of few seconds. GPS receiver 52 also calculates the Predicted Reachable Set (PRS) of the aircraft attached to the extrapolated trajectory. The period length is based on the histogram of the GDOP quality along the actual preceding trajectory.

Step 62: Receiving 4 satellites or more, GPS receiver 52 continues to run the filtering and extrapolating algorithms, and again calibrates its (short term) high accuracy clock according to the GPS clock.

Step 64: Receiving less than 4 satellites, GPS receiver 52 uses its accurate clock to calculate the new ranges to the available satellites and uses them to get the best estimation of aircraft position and velocity.

Step 66: Having three satellites at hand, GPS receiver 52 gets the GPS estimation of the aircraft position.

Step 68: If this point falls into the PRS, GPS receiver 52 takes it as the new aircraft position.

Step 70: If not, GPS receiver 52 finds the nearest point on the PRS envelope to the GPS estimation.

Step 72: Having only two satellites, GPS receiver 52 determines the common section of the two spheres' (around the appropriate satellites) intersection line and the PRS.

Step 74: On this section GPS receiver 52 takes the nearest point to the predicted trajectory as the new aircraft position.

Step 76: If the common section is empty, GPS receiver 52 has to find the nearest point on the PRS envelope to the two spheres intersection line and this point is the new aircraft position.

Step 78: Having only one satellite at hand, GPS receiver 52 determines the common volume of the sphere, with the PRS. The nearest point of this common volume to the predicted aircraft trajectory will be defined as the new aircraft position.

Step 80: If the common volume is empty group, GPS receiver 52 finds the nearest point on PRS envelope to the sphere envelope, and this point is the new aircraft position.

Another aspect of the present invention addresses calculating engine thrust from other aircraft performance parameters and applications for the results.

The pilot uses the throttles of his engines to set the right thrust needed for his flight. Changes in throttle position affect the engine life span. Soft continuous changes in thrust have a different affect than fast extreme changes.

Preventive maintenance techniques may include predicting when to overhaul or replace critical engine parts, which is a requirement for safe flight. Some aircraft are not equipped with sensors or other monitoring devices for gathering the information required to determine when it is necessary to do the parts replacement. As a result, the maintainers assume a worse case scenario and perform parts replacement earlier than might be necessary. It would make the replacement of engine parts and overhauls less costly if they were done according to a utilization profile of the particular engine.

This embodiment of the present invention provides a software basis for estimating thrust values accurately enough for implementing preventive maintenance techniques. This solution allows the aircraft operator to enjoy the benefit of an efficient maintenance profile, without the need to modify and install hardware into the aircraft throttles. Hardware modification is very expensive and integrating such modification into the engine system can reduce flight safety.

Another important implementation for the present invention is in the field of embedded simulation and ACMI (Air Combat Maneuvering Instrumentation) scenarios where thrust values have an important role on the value of IR (infrared) emission of the aircraft. The reception accuracy of an IR-homing missile affects the range in which detection can be achieved by orders of magnitude. A valid simulated missile launch in a training dogfight has to have the target right IR emission and therefore the correct envelope for the target aircraft.

A software module that compares the actual aircraft maneuvers and database of aircraft performance, gives the calculated required trust for such maneuvers.

Using an aircraft's equation of longitudinal motion, with standard air data measured during flight as inputs and calibrated drag/lift models, the thrust values can be calculated directly.

An example, comprising part of a preferred embodiment of the present invention is provided below.

The air data needed is the following:

| | |
|---|---|
| True air speed | $V_a$ |
| True ground speed | $V_g$ |
| Pressure altitude | $H_p$ |
| Mach number | $M$ |
| Angle of attack | $\alpha$ |
| Rate of climb | $\dot{H}$ |
| Relative air density | $\rho'$ (or ambient temperature $T_a$) |
| Air craft estimated mass | $m$ |
| Maneuvering G no. | $N_g$ |

The equation for determining longitudinal motion:

$$\text{Thrust} = mg\,\dot{H}/V + m\dot{V} + \text{Drag}$$

The drag model involves two parameters:

One parameter is related to the zero-lift drag, and the other parameter is related to the induced drag. The zero lift drag is a simple function of the Mach number.

Another parameter is related to the influence of air speed on engine thrust.

All four parameters can be calibrated for a specific aircraft during special short flight passes performed with pre-determined discrete throttle settings and thrust values.

The following are some applications for this embodiment of the present invention:

1. Software modules that recommend when to perform preventive replacement of aircraft engines or engine parts. The modules continuously calculate the engines thrust values, record it, and evaluate the engine accumulated fatigue status.

2. Software modules that simulate the value of IR emission of the aircraft. The software calculates the thrust values with relation to flight level and type of the engine. The results are used as inputs to a missile simulation system that simulates different IR missile launches. Using the correct IR signature with relation to the aircraft maneuvers and thrust values achieves more realistic missile simulations.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A global positioning system receiver for use to determine accurate position during flight based on data received from GPS satellites, the receiver including a clock with high short term accuracy, to allow determination of position when data is received from less than four satellites, wherein the receiver is able to: extrapolate a trajectory forward for a period of a few seconds, and calculate a predicted reachable set (PRS) related to the extrapolated trajectory; and while receiving data from four satellites or more, to calibrate the clock in synchrony with the GPS clock.

2. The receiver of claim 1, wherein said receiver is able to calculate, when receiving data from less then four satellites, new ranges to available satellites using the clock, and based on the new ranges to estimate position.

3. The receiver of claim 1, wherein the receiver is able to calculate, when receiving data from less then four satellites, new ranges to available satellites using the clock, and based on the new ranges to estimate velocity.

4. The receiver of claim 2, wherein when receiving data from three satellites, the receiver is able to get GPS estimation of the aircraft position, and if the position falls into the PRS, to consider the position to be a new determined position.

5. The receiver of claim 2, wherein when receiving data from three satellites, the receiver is able to get the GPS estimation of the aircraft position, and if the position does not fall into the PRS, to determine the nearest point on the PRS to a GPS estimation.

6. The receiver of claim 2, wherein when receiving data from two satellites, said receiver is able to determine a common section of an intersecting line between two imaginary spheres emanating the two satellites and the PRS, and to consider the nearest point to the predicted trajectory as a new position.

7. The receiver of claim 6, wherein if the common section is empty, the receiver is able to determine the nearest point on the PRS intersection line and to consider the point to be the new position.

8. The receiver of claim 2, wherein when receiving data from one satellite, the receiver is able to determine a common volume of an imaginary sphere emanating from the satellite, with the PRS, and to consider the nearest point of the common volume to a predicted trajectory as a new position.

9. The receiver of claim 8, wherein if the common volume is empty, the receiver is able to determine the nearest point on the PRS to the sphere, and to consider this point to be the new position.

\* \* \* \* \*

UNITED STATES PATENT AND TRADEMARK OFFICE
CERTIFICATE OF CORRECTION

PATENT NO. : 7,605,750 B2  
APPLICATION NO. : 10/554503  
DATED : October 20, 2009  
INVENTOR(S) : Aviv Tzidon Page 1 of 1

It is certified that error appears in the above-identified patent and that said Letters Patent is hereby corrected as shown below:

In the Title page, at item (60), line 5, replace the number 60/474,251 and date May 28, 2003 of the provisional application indicated therein by the following:

No. 60/474,253, filed on May 30, 2003

Signed and Sealed this  
Twenty-fifth Day of October, 2011

David J. Kappos  
*Director of the United States Patent and Trademark Office*